Figure 1:
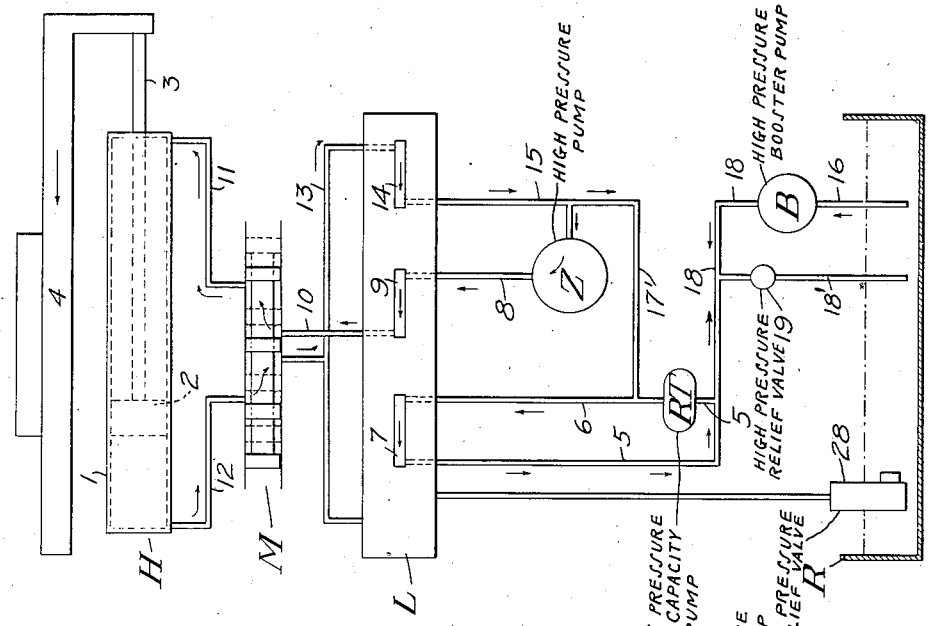

Dec. 8, 1931.　　　H. ERNST ET AL　　　1,835,978
MULTIPLE CLOSED CIRCUIT HYDRAULIC SYSTEM

Filed May 15, 1929

Inventors
Hans Ernst
Lester F. Menninger
By Attorney
Nathan T Bowman

Patented Dec. 8, 1931                                                                      1,835,978

UNITED STATES PATENT OFFICE

HANS ERNST AND LESTER F. NENNINGER, OF CINCINNATI, OHIO, ASSIGNORS TO THE CINCINNATI MILLING MACHINE COMPANY, OF CINCINNATI, OHIO, A CORPORATION OF OHIO

MULTIPLE CLOSED CIRCUIT HYDRAULIC SYSTEM

Application filed May 15, 1929. Serial No. 363,230.

This invention relates to hydraulic transmissions of that type which seeks to effect a uniform rate of movement of an actuated member by delivering into an hydraulic motor, at a volumetrically constant rate, what may be termed "pushing-oil".

Hydraulic systems of this nature, while not limited thereto, are particularly advantageous when utilized to actuate a reciprocatory element of a machine tool, such, for example, as the work-table of a milling machine. The invention will therefore, for convenience, be described in connection with that particular type of machine tool.

The work-table of a milling machine must, for practical operation, be translated at various times in opposite directions and at rapid and slow rates, the rapid translation being employed quickly to position the work relative to the tool prior to a machining operation, and the slow translation being utilized to feed the work past the tool during the cutting operation.

Present day milling machines are adapted to cut either "with" or "against" the feed, that is, the cutter may be so rotated that its action on the work may tend to drag the work in the direction of the feed or it may be rotated in the opposite direction with respect to the movement of the work whereby the action of the cutter on the work tends to retard the movement of the table.

To give to the table its required movements and to insure a uniform rate of travel under the varying conditions, we have heretofore provided an hydraulic system comprising a high capacity low pressure pump adapted to effect rapid traverse of the table, a relatively lower capacity high pressure pump adapted to force oil into the receiving end of the hydraulic motor to effect slow feeding movements of the piston and the table connected therewith, and a third or booster pump of relatively high pressure and lower capacity connected to the exhaust end of the motor and adapted to maintain a high back pressure therein. This system forms the subject of our pending application, Serial Number 362,414, filed May 11, 1929.

In the system disclosed in said application the amount of back pressure in the exhaust end of the motor is controlled by a high pressure relief valve through which a portion of the oil delivered by the booster pump is exhausted.

The present invention is an improvement over that set forth in our prior application, in that it embodies all of the advantages of the prior system, and, in addition, provides a construction in which, during the rapid traverse movement of the work-table, the booster pump is enabled to exhaust through a relatively low-pressure relief valve instead of the high pressure relief valve above referred to, through which it exhausts during slow-feeding movements of the table. By reason of this construction and arrangement the power loss during rapid traverse movement of the table will be substantially less than in our prior system.

Figure 2:
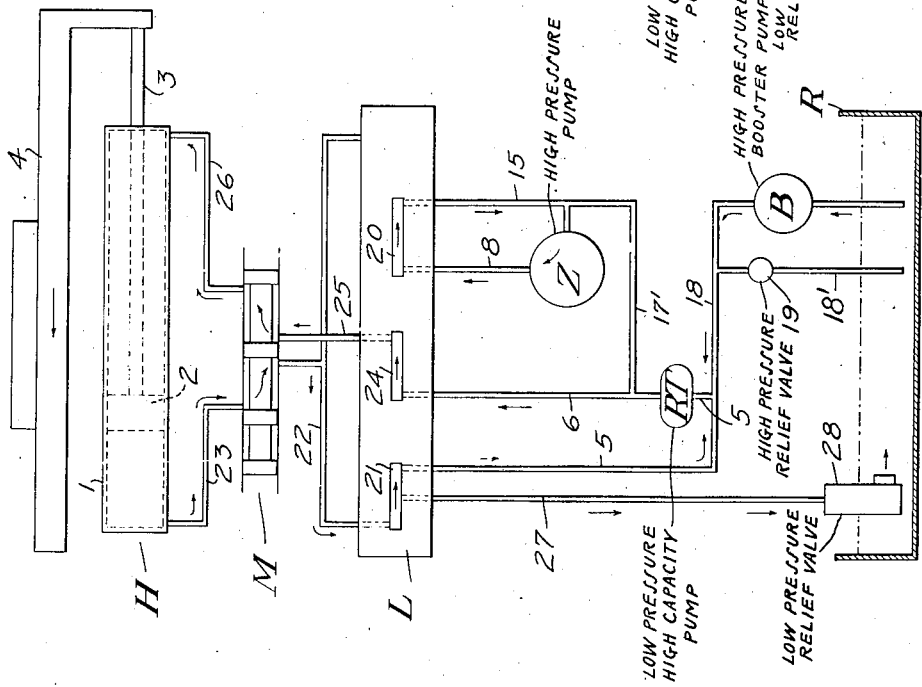

In the annexed drawings, forming a part of this disclosure, Figure 1 is a diagrammatic view of our improved hydraulic system, the controlling valves thereof being so set as to effect slow feeding movement of the actuated element to the left, the rate of feed being determined by the action of a variable delivery pump connected with the intake end of the hydraulic motor. Fig. 2 is a similar view with the valves set in a different position, thereby to effect a rapid traverse movement of the actuated element to the left.

Referring more specifically to the drawings, the improved hydraulic system is disclosed as comprising a reservoir R adapted to contain a supply of actuating liquid, preferably oil; an hydraulic motor H, comprising a cylinder 1 and piston 2, and a plurality of pumps, valves and conduits, later to be described, connecting the reservoir and the motor. The motor is, of course, intended to do work and this may be effected by having the piston 2 connected, as by a piston rod 3, with a reciprocatory element or table 4. For the purpose of this disclosure the element 4 may be considered to be the work-table of a milling machine inasmuch as the features of this invention may be employed to advantage when embodied in that type of machine tool.

The pumps embodied in this system comprise a low pressure high capacity pump RT, adapted to effect rapid traverse movements of the reciprocatory table 4; a low capacity high pressure booster pump B adapted to be connected to the exhaust end of the cylinder 1, to build up in said end a high resisting pressure; and a high pressure pump Z having its discharge port connected with the intake end of said cylinder and serving to inject oil thereinto at a volumetrically uniform rate. The pump Z may receive oil from any suitable source but preferably it is connected to receive oil from the exhaust end of the hydraulic motor. To enable the table to be moved at any desired uniform rate, the pump Z is preferably of the variable delivery type which, by means of adjustment, may be caused to deliver oil into the intake end of the motor at any desired volumetrically uniform rate from zero to the maximum capacity of the pump.

Intermediate the pumps RT, B and Z and the hydraulic motor H, are two valves, one, L, which serves as a selector or main control valve and the other, M, which serves as a supplemental or stop valve. The valve L is adapted to control the direction of flow of oil to and from the motor H and to determine which of the pumps RT or Z may be effective to actuate said motor. The valve M serves either to connect the motor H with the valve L, as shown in full lines in the drawings, or to isolate the motor from the valve L and the pumps, as shown in dotted lines in Fig. 1, thereby to trap the oil in the opposite ends of the motor H when it is desired to lock the table 4 against movement in either direction. The construction and operation of the valves L and M are clearly shown and described in our application, Serial Number 220,721, filed September 15, 1927 and also in British Patent No. 297,104. Detailed illustration and description thereof, in this application, is therefore deemed unnecessary.

Fig. 1 shows the valves set to effect slow feeding movement of the table 4 to the left. In this setting of the valves the rapid traverse pump RT is short circuited, drawing oil in through conduit 5 and discharging it through conduit 6, port 7 in valve L and returning it to the pump through conduit 5. Thus in this setting of the valves the rapid traverse pump has no effect upon the hydraulic motor. As shown in Fig. 1 the pump Z has its discharge port connected, by conduit 8, port 9 in valve L, conduit 10, through valve M, conduit 11 with the right end of the hydraulic motor H, thereby injecting oil thereinto and causing movement of the piston 2 and table 4 to the left. Oil in the left end of the cylinder 1 is exhausted through conduit 12, through valve M, conduit 13, port 14 in valve L, and conduit 15. Preferably the conduit 15 connects with the intake port of the variable delivery pump Z whereby oil exhausted from the left end of the cylinder is forced into the right end thereof, making, in effect, a substantially closed circuit.

As previously stated, it is desirable that a high back pressure be maintained in the exhaust end of the motor H. This is effected by means of the high pressure booster pump B which draws oil from the reservoir R through conduit 16 and discharges it through conduit 18 which is connected with the conduit 15 by means of the conduit 5, port 7, and conduits 6 and 17'. The excess oil delivered by the pump B is returned to the reservoir through a relief line 18' controlled by a high pressure relief valve 19, the setting of which determines the amount of back pressure on the exhaust end of the hydraulic motor.

In certain milling operations in which the action of the cutter on the work tends to move the work-table in the direction of feed, in order to produce the required margin of safety, it is necessary that the relief valve 19 be set to withstand a pressure up to 400 lbs. per square inch. It is therefore obvious that the exhaust of any substantial amount of oil through that valve would result in the consumption of a substantial amount of power and likewise would result in the undesirable heating of the oil.

In our application, Serial No. 362,414, above referred to, we have disclosed a system in which the amount of oil exhausted against high back pressure is materially less than in prior systems. The present invention provides a system in which the amount of oil exhausted against high back pressure is still further reduced.

Fig. 2 shows the valve L set to effect rapid traverse movement of the table 4 to the left. In this setting, the pump Z is short circuited, thereby effecting a continuous flow of oil through conduit 8, port 20, in the valve L, and conduit 15. The high capacity rapid traverse pump RT has its intake port connected by conduit 5, port 21, in valve L, conduit 22, through valve M, and conduit 23, with the left or exhaust end of the hydraulic motor H. The discharge port of the pump RT is connected by conduit 6, port 24, in valve L, conduit 25, through valve M, and conduit 26 with the right or intake end of said motor. Thus it will be seen that a large volume of oil will be rapidly withdrawn from the left end of the cylinder 1 and forced into the right end thereof, thereby effecting a rapid movement of the piston 2 and table 4 to the left. During this rapid traverse movement the constantly acting booster pump B is not required to discharge against the high back pressure of the valve 19 as it does during the feeding movement. As will be perceived from an inspection of Fig. 2, the pump B has its discharge port connected, as by means of conduit 18, with the intake side of the rapid traverse pump RT. The conduit 18 is also connected, by conduit 5, port 21, and auxiliary return conduit 27, with the reservoir R. The latter conduit is closed at its lower end by a low pressure relief valve 28. This valve serves merely to prevent the oil from draining freely to the reservoir, therefore a setting of this valve to produce a back pressure of 10 pounds per square inch will suffice. Thus it will be seen that in the present system during the rapid traverse movement the booster pump exhausts against a substantially lower back pressure than it does in our prior system above referred to, and therefore the power losses will be materially less.

Although only two positions of the valve L have been shown and described it is to be understood that it may be shifted to two other positions in which the system effects respectively rapid traverse and slow feed to the right. Likewise the valve M may be shifted to the position shown in dotted lines in Fig. 1 to isolate the hydraulic motor from all of the three pumps and to close the conduits 11 and 12 against exhaust. This traps oil in the opposite ends of the cylinder and positively locks the piston 2 and table 4 against movement in either direction.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claims.

Having thus revealed this invention, we claim as new and desire to secure the following combinations and elements, or equivalents thereof, by Letters Patent of United States:—

1. An hydraulic system combining a motor; a reservoir; a high capacity pump adapted to deliver oil into said motor to effect relatively rapid actuation thereof; a second pump adapted to be connected with the intake side of said motor to deliver oil thereinto, thereby to effect relatively slow actuation thereof; a third pump, receiving oil from said reservoir, adapted, when the second pump is connected with the intake side of said motor to have its discharge port connected with the exhaust side of said motor thereby to maintain therein a pressure counter to the pressure built up in the intake side thereof by said second pump; a relatively high pressure relief line connected with said third pump and effective during actuation of said motor by said second pump; and a relatively low pressure relief line connected with said third pump and effective during rapid actuation of said motor by said first pump.

2. An hydraulic system combining a motor; a reservoir; a first pump of high capacity adapted to deliver oil to said motor to effect relatively rapid actuation thereof; a second pump adapted to be connected with the intake side of said motor to deliver oil thereinto, thereby to effect relatively slow actuation thereof; a third pump, receiving oil from said reservoir, adapted to have its discharge port connected with the exhaust side of said motor when the second pump is connected with the intake side of said motor thereby to maintain therein a pressure counter to the pressure built up in the intake side by said second pump; a high pressure relief line for said third pump; a low pressure relief line for said third pump; and a valve for connecting one of the first two mentioned pumps with said motor and for connecting said third pump with said low pressure relief line when the first pump is connected with the motor.

3. An hydraulic system combining a motor; a reservoir; a first pump of high capacity adapted to deliver oil to said motor to effect relatively rapid actuation thereof; a second pump of high pressure adapted to have its discharge port connected with the intake side of said motor to deliver oil thereinto; a discharge conduit connected with the exhaust side of said motor and extending to said reservoir; a high pressure relief valve embodied in said conduit; a third pump of high pressure and low capacity receiving oil from said reservoir and connected with the exhaust side of said motor when the second pump is connected with the intake side of said motor, to build up back pressure therein; a second relief line for said third pump; a low pressure relief valve controlling the flow through said second relief line; a valve for selectively rendering either said first or second pump effective to actuate said motor and for connecting said third pump with said low pressure relief line when said first pump is rendered effective to actuate said motor.

4. An hydraulic system combining a motor; a reservoir; a first pump of high capacity adapted to deliver oil into said motor to effect relatively rapid actuation thereof; a second pump of high pressure adapted to have its discharge port connected with the intake side of said motor to deliver oil thereinto; a discharge conduit connected with the exhaust side of said motor and with the intake port of said second pump; a third pump of high pressure receiving oil from said reservoir and injecting it into said discharge conduit; a high pressure relief valve in said discharge conduit to limit the maximum pressure therein; an auxiliary relief conduit adapted to be connected with said third pump; a low pressure relief valve embodied in said auxiliary relief conduit; and valve means selectively to render said first or second pumps effective to actuate said motor and to connect the third pump with said auxiliary relief conduit when said first pump is rendered effective.

5. An hydraulic system combining a motor; a first pump adapted to deliver oil into said motor to effect rapid actuation thereof; a second pump adapted to have its intake and discharge ports connected respectively with the opposite sides of said motor to effect slow actuation thereof; a third pump adapted to maintain a high pressure on the exhaust side of said motor during slow actuation thereof; a high pressure relief valve connected with said third pump and determining the pressure in the exhaust side of said motor; a low pressure relief valve disconnected from said third pump during slow actuation of said motor; and valve means for simultaneously connecting said first pump with said motor, short-circuiting said second pump, and connecting said low pressure relief valve with said third pump.

6. An hydraulic system combining a motor; a reservoir; a first pump of high capacity and relatively low pressure adapted to have its intake port connected with the exhaust end of said motor and its discharge port connected with the intake end thereof to effect rapid actuation of said motor; a high pressure pump adapted to have its intake port connected with the exhaust end of said motor and its discharge port connected with the intake end thereof to effect slow actuation of said motor; valve means selectively to render said pumps effective to actuate said motor; a high pressure booster pump receiving oil from said reservoir, said booster pump having its discharge port permanently connected with the intake port of the first pump and temporarily connected with the exhaust end of said motor when the motor is actuated by said second pump; a high pressure relief valve permanently connected with the discharge line of said booster pump; and a low pressure relief line temporarily connected with the exhaust line of said booster pump during rapid actuation of said motor by said first pump.

In witness whereof, we have hereunto subscribed our names.

HANS ERNST.
LESTER F. NENNINGER.